United States Patent [19]

Faust

[11] 3,752,508

[45] Aug. 14, 1973

[54] BOWL GUARD CONNECTOR
[75] Inventor: Delbert G. Faust, Denver, Colo.
[73] Assignee: C. A. Norgren Co., Littleton, Colo.
[22] Filed: Feb. 22, 1972
[21] Appl. No.: 227,989

[52] U.S. Cl.................... 285/307, 285/308, 138/96, 220/550, 220/82 R
[51] Int. Cl............................................. F16l 37/00
[58] Field of Search.................... 285/305, 308, 314; 138/89.1, 89.2, 89.3, 89.4, 96 R, 96 T; 220/82 R; 215/12, 13; 210/399, 449, 450, 463

[56] References Cited
UNITED STATES PATENTS

| | | | |
|---|---|---|---|
| 1,464,386 | 8/1923 | Ingram | 285/276 |
| 1,188,132 | 6/1916 | Anderson | 215/12 R |
| 2,038,869 | 4/1936 | Rader | 285/287 |
| 2,458,714 | 1/1949 | Mahoney | 285/305 |
| 2,403,368 | 7/1946 | Howard | 285/305 |
| 2,156,329 | 5/1939 | Beck | 210/451 |
| 1,650,801 | 11/1927 | Marcus | 215/12 R |
| 2,019,421 | 10/1935 | Link | 137/377 |
| 568,787 | 10/1896 | Oster | 210/449 |

FOREIGN PATENTS OR APPLICATIONS

| | | | |
|---|---|---|---|
| 225,666 | 11/1959 | Australia | 285/305 |

Primary Examiner—David J. Williamowsky
Assistant Examiner—Conrad L. Berman
Attorney—Sheridan, Ross & Fields

[57] ABSTRACT

A connector for joining a bowl guard to the housing of a fluid control component which is very simple to use and which permits the use of easily fabricated parts is disclosed. The fluid control component includes a housing with a depending flange to which a plastic or glass bowl is attached, the flange having a peripheral groove therein. The bowl guard has a peripheral lip with a groove that is alignable with the groove of the housing to form an annular recess when the lip of the bowl guard is placed over the flange of the housing in telescopic relationship. A flexible resilient elongated connector, such as a coil spring, having a cross-sectional area substantially corresponding to that of the annular recess is insertable through a notch in the lip into the annular recess and the protrusions of the coil spring are engageable with transverse ribs in the housing groove to hold the connector upon rotation of the bowl guard with respect to the housing. The groove of the bowl guard moves longitudinally therealong until the connector is enclosed within the annular recess after approximately one revolution of the bowl guard to prevent separation of the bowl guard from the housing due to shear forces.

9 Claims, 5 Drawing Figures

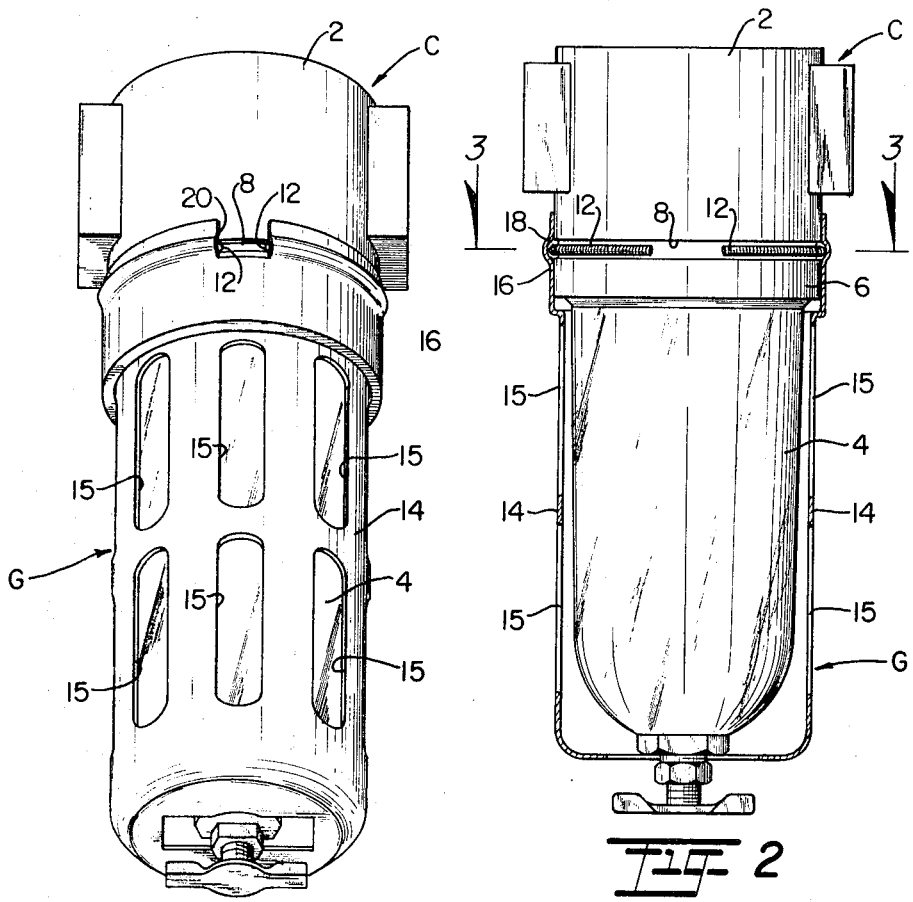
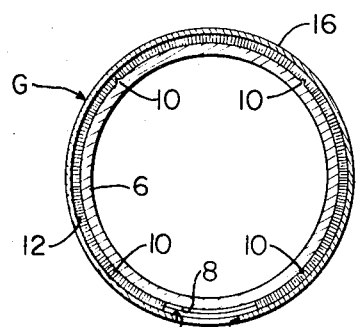
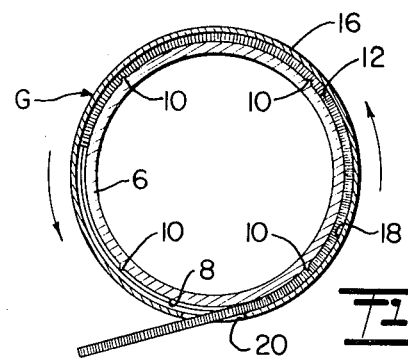
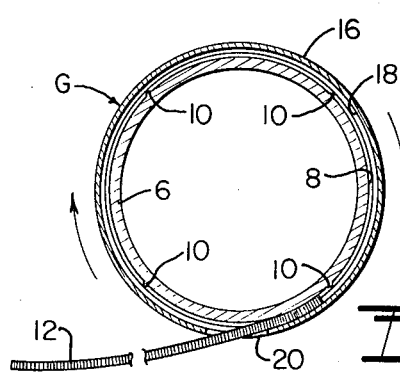

BOWL GUARD CONNECTOR

BACKGROUND OF THE INVENTION

1. Field of the Invention

This invention relates to a connector for removably coupling cylindrical portions of two elements together and more particularly to a coupling for removably connecting a bowl guard to a housing of a fluid control component.

2. Description of the Prior Art

In fluid control components such as airline lubricators and filters and filter-regulator combinations, a bowl is included which is made of material such as glass or plastic, which if not protected may become broken. Therefore, a bowl guard, which extends around the bowl and has a threaded upper lip which engages threads on a flange extending from the housing of the component adjacent the bowl is often provided. In order to form threads on the bowl guard it must be made of relatively heavy material which results in a relatively costly product. Also, when the bowl guard is installed the threads of the guard must be properly aligned with the threads of the housing so that the two can be attached together and the bowl guard must be turned through several revolutions to draw the guard up tight around the bowl.

SUMMARY OF THE INVENTION

In accordance with this invention a device for coupling first and second cylindrical elements is provided wherein the first element has a cylindrical flange and the second element has a peripheral lip connectable to the flange when the lip and flange are positioned in overlapping telescopic relationship. The device includes means defining a first peripheral groove in the flange of the first element; means defining a second peripheral groove in the lip of the second element and alignable with the first groove to form an annular recess when the lip and flange are overlapped; means defining a notch in the lip extending through the second groove and exposing a portion of the first groove when the first and second grooves are aligned; and a flexible elongated connector insertable through the notch into the annular recess and having a cross-sectional area essentially filling the recess so that the connector engages both the first and second grooves to prevent separation of the first and second elements due to shear forces.

More specifically, the invention has particular utility in a fluid control component for attaching a bowl guard to a housing from which a plastic or glass bowl depends. The bowl guard has a peripheral lip connectable to a depending cylindrical flange on the housing when the lip and flange are positioned in overlapping telescopic relationship to bring peripheral grooves on each into mating relationship to form an annular recess. The peripheral groove on the housing flange has transverse ribs for gripping the connector between it and the other groove to facilitate insertion of the connector by rotating the bowl guard with respect to the housing whereby the connector is held stationary by the ribs with respect to the groove on the flange but the groove on the lip is movable longitudinally with respect to the connector so that approximately one revolution of the bowl guard will position the connector within the recess. Advantageously, the connector may be formed as a coil spring whose coils form protrusions which engage opposite sides of the ribs to prevent relative movement therebetween. Furthermore, since the connector is resilient, the bowl guard can easily be removed by simply rotating it so that one end thereof springs through the notch and continued rotation of the bowl results in removal of the connector from the annular recess upon approximately one revolution of the bowl guard to permit servicing of the bowl.

Additional novel features of the invention will become apparent from the description which follows, taken in conjunction with the accompanying drawings.

BRIEF DESCRIPTION OF THE DRAWINGS

FIG. 1 is a perspective view of the novel connector of this invention used in connection with a bowl guard attached to a housing of a fluid control component;

FIG. 2 is a side elevation of the fluid control component of FIG. 1 with the bowl guard in section to show details of the connector;

FIG. 3 is a horizontal section, taken along line 3—3 of FIG. 2, showing the connector positioned within an annular recess formed by the mating grooves on the housing and bowl guard;

FIG. 4 is a horizontal section, similar to FIG. 3, but showing the connector being removed so that the bowl guard can be separated from the housing; and FIG. 5 is a horizontal section, similar to FIGS. 3 and 4, but showing the connector being inserted in the annular recess to interconnect the bowl guard and the housing.

DESCRIPTION OF THE PREFERRED EMBODIMENT

In accordance with this invention a fluid control component C having a housing 2 to which a plastic or glass bowl 4 is attached is adapted to receive a bowl guard G therearound as shown in FIGS. 1 and 2 to protect the bowl from possible breakage. The bowl guard G may be used with any fluid control component that requires a bowl, such as a filter for air of the type disclosed in commonly assigned U.S. Pat. No. 3,418,789 to Hoffman et al which issued Dec. 31, 1968.

In any event, the bowl 4 is attached to a depending circular flange 6 having a peripheral groove 8 therein, formed, as by casting, when the housing is made. The peripheral groove 8 is provided with a series of ribs 10 spaced therearound, as best seen in FIGS. 3-5 which are used for holding connector 12, which may take the form of a coil spring, during insertion and removal as described more fully below.

Conveniently, the bowl guard G includes a body 14 which encases bowl 4 and has longitudinal slots 15 therein through which the bowl may be viewed. The bowl guard also has a peripheral lip 16 with a peripheral groove 18 which may be die-formed therein, thereby permitting bowl guard G to be made out of relatively light-weight, inexpensive material. Advantageously, when groove 18 is aligned with groove 8 an annular recess is formed therebetween for receiving connector 12. Lip 16 has a notch 20 formed therein as best seen in FIG. 1, which extends through groove 18 and thereby exposes groove 8.

The novel connector arrangement provides for quickly disconnecting the bowl guard from the housing so that the bowl can be serviced and for quickly reconnecting the bowl guard to the housing. To disconnect the bowl guard, the servicemen need merely rotate the bowl in either direction for approximately one revolution. FIG. 4 illustrates removal by rotation in the couterclockwise direction. As the guard begins to turn the end of connector 12 will spring out so that it projects through slot 20 and because of its resilient nature will tend to assume a generally linear configuration so that as the guard is rotated the connector will be urged out of the annular recess by the trailing edge of slot 20 until the entire connector is removed at which time the guard can be lowered from the bowl. Conveniently, ribs 10 engage protrusions formed by the coils of connector 12 and provide frictional engagement between connector 12 and groove 8 so that the connector does not move relatively thereto but groove 18 on bowl guard G slides longitudinally with respect thereto.

Conversely, when it is desired to connect the bowl guard to the housing the bowl guard is positioned so that groove 18 of the bowl guard is aligned with groove 8 of the housing to form the annular recess. While in this position one end of the connector 12 is inserted through notch 20 in the direction shown after which the bowl guard is rotated in a clockwise direction as shown in FIG. 5. Of course, it will be understood that the end of the connector can be inserted in the opposite direction and the bowl guard rotated in a couterclockwise direction. As the transverse ribs 10 sequentially come in contact with the connector and engage the space between the protrusions thereof the connector is frictionally held against longitudinal movement within groove 8 but groove 18 slides longitudinally with respect thereto so that the trailing edge of notch 20 urges connector 12 into the annular recess until the entire connector is positioned therein. Since the connector has a cross-sectional area substantially equal to the anular recess, it will lock the bowl guard to the housing to prevent separation therefrom due to shear forces exerted longitudinally of the bowl guard. Conveniently, the connector is slightly shorter than the length of the peripheral grooves so that the ends of the connector are located at each side of notch 20, as best seen in FIG. 1.

From the foregoing, the advantages and novel features of this invention are readily apparent. A connector for removably connecting two elements together has been provided which can be operated rapidly and is of simple and inexpensive construction. Corresponding grooves on the housing and the bowl guard can be aligned and an elongated resilient connector can be inserted through a notch in the bowl guard into an annular recess formed by the grooves and upon rotation of the bowl guard can be positioned within the annular recess to prevent separation of the bowl guard from the housing due to shear forces. Similarly, to separate bowl guard G from housing 2 the bowl guard need only be rotated so that the end of resilient connector 12 springs through opening 20 and upon further rotation of the bowl guard for approximately one revolution, it is disconnected therefrom, as described above.

The invention has been described in detail with reference to a preferred embodiment thereof, but it will be understood that variations and modifications can be effected within the spirit and scope of the invention.

What is claimed is:

1. A device for coupling first and second cylindrical elements wherein said first element has a cylindrical flange and said second element has a peripheral lip connectable to the flange when the lip and flange are positioned in overlapping, telescoped relationship, the improvement comprising:
   means defining a first peripheral groove in said flange of first element;
   means defining a second peripheral groove in said lip of said second element and alignable with said first groove to form an annular recess when said lip and flange are overlapped:
   means defining a notch in said lip extending through said second groove and exposing a portion of said first groove when said first and second grooves are aligned;
   a flexible elongated connector insertable through said notch into said annular recess and having a cross-sectional area essentially filling said recess so that said connector engages both said first and second grooves to prevent separation of the first and second elements due to shear forces; and
   at least one transverse rib in one of said grooves for gripping said connector between it and the other groove to facilitate insertion thereof by rotating one element with respect to the other element when said grooves are aligned so that said connector is held stationary by said rib with respect to said one groove but said other groove is movable longitudinally with respect to said connector so that approximately one revolution of said bowl will position said connector within said recess.

2. The improvement calimed in claim 1 wherein:
   said connector has a plurality of transverse protrusions longitudinally spaced therealong for engaging said rib in said one groove.

3. The improvement claimed in claim 1 wherein:
   said connector is shorter than the length of said peripheral grooves so that said connector does not extend into said notch when said connector is in position within said annular recess.

4. In a fluid control component having a housing, a bowl attached to the housing and a bowl guard extending around the bowl and having a peripheral lip connectable to a depending cylindrical flange on the housing when the lip and flange are positioned in overlapping, telescoped relationship, the improvement comprising:
   means defining a first peripheral groove in said flange of the housing;
   means defining a second peripheral groove in the lip of the bowl guard and alignable with said first groove to form an annular recess when said lip and flange are overlapped;
   means defining a notch in the lip of the bowl guard extending through said second groove and exposing a portion of said first groove when said first and second grooves are aligned;
   a flexible elongated connector insertable through said notch into said annular recess and having a cross-sectional area essentially filling said recess so that said connector engages both said first and second grooves to prevent separation of the bowl guard from the housing due to shear forces; and
   at least one transverse rib in one of said grooves for gripping said connector between it and the other groove to facilitate insertion thereof by rotating said bowl guard with respect to said housing when said grooves are aligned so that said connector is held stationary by said rib with respect to said one groove but said other groove is movable longitudinally with respect to said connector so that approximately one revolution of said bowl will position said connector within said recess.

5. The improvement claimed in claim 4 wherein:
said connector has a plurality of transverse protrusions longitudinally spaced therealong for engaging said rib in said one groove.

6. The improvement claimed in claim 4 wherein;
said connector is shorter than the length of said peripheral grooves so that said connector does not extend into said notch when said connector is in position within said annular recess.

7. In a fluid control component having a housing, a bowl attached to the housing and a bowl guard extending around the bowl and having a peripheral lip connectable to a depending cylindrical flange on the housing when the lip and flange are positioned in overlapping, telescoped relationship, the improvement comprising:
means defining a first peripheral groove in said flange on the housing;
means defining a second peripheral groove in the lip of the bowl guard and alignable with said first groove to form an annular recess when said lip and flange are overlapped;
means defining a notch in the lip of the bowl guard extending through said second groove and exposing a portion of said first groove when said first and second grooves are aligned;
a flexible elongated connector insertable through said notch into said annular recess and having a cross-sectional area essentially filling said recess so that said connector engages both said first and second grooves to prevent separation of the bowl guard from the housing due to shear forces; and
at least one transverse rib in said first groove for gripping said connector between it and said second groove to facilitate insertion thereof by rotating the bowl guard with respect to the housing so that said connector is held staionary by said rib with respect to said first groove but said second groove is movable longitudinally with respect to said connector so that approximately one revolution of the bowl guard will position said connector within said recess.

8. The improvement claimed in claim 7 wherein:
a plurality of transverse ribs are spaced along said first groove; and
said connector comprises a coil spring.

9. In a fluid control component having a housing, a bowl attached to the housing and a bowl guard extending around the bowl and having a peripheral lip connectable to a depending cylindrical flange on the housing when the lip and flange are positioned in overlapping, telescoped relationship, the improvement comprising:
means defining a first peripheral groove in said flange of the housing;
means defining a second peripheral groove in the lip of the bowl guard and alignable with said first groove to form an annular recess when said lip and flange are overlapped;
means defining a notch in said lip extending through said second groove and exposing a portion of said first groove when said first and second grooves are aligned;
a flexible elongated connector having a plurality of transverse protrusions longitudinally spaced therealong and being insertable through said notch into said annular recess and having a cross-sectional area essentially filling said recess so that said connector engages both said first and second grooves to prevent separation to the bowl guard from the housing due to shear forces; and
a plurality of transverse ribs in said first groove for engaging and gripping said connector between protrusions thereof to facilitate insertion by rotating the bowl guard with respect to the housing when said grooves are aligned so that said connector is held stationary by said ribs with respect to said first groove but said second groove is movable longitudinally with respect to said connector so that approximately one revolution of the bowl guard will position said connector within said recess.

* * * * *